US010687518B2

United States Patent
Cote

(10) Patent No.: US 10,687,518 B2
(45) Date of Patent: Jun. 23, 2020

(54) BIRD FEEDER

(71) Applicant: Paul L. Cote, Lac Brome (CA)

(72) Inventor: Paul L. Cote, Lac Brome (CA)

(*) Notice: Subject to any disclaimer, the term of this patent is extended or adjusted under 35 U.S.C. 154(b) by 151 days.

(21) Appl. No.: 15/999,997

(22) Filed: Sep. 7, 2018

(65) Prior Publication Data
US 2020/0077626 A1    Mar. 12, 2020

(51) Int. Cl.
A01K 39/01    (2006.01)
A01K 39/012   (2006.01)

(52) U.S. Cl.
CPC ........ A01K 39/012 (2013.01); A01K 39/0113 (2013.01)

(58) Field of Classification Search
CPC .............. A01K 39/0113; A01K 39/012; A01K 39/014; A01K 31/12; A01K 39/00; A01K 39/01; A01K 39/0125
USPC ........ 119/57.9, 52.3, 51.01, 57.8, 52.2, 52.4, 119/63
See application file for complete search history.

(56) References Cited

U.S. PATENT DOCUMENTS

| | | | | |
|---|---|---|---|---|
| 3,090,354 A * | 5/1963 | Merritt | ............... | A01K 39/0113 119/52.4 |
| 4,327,669 A * | 5/1982 | Blasbalg | ............. | A01K 39/0113 119/57.8 |
| RE32,970 E * | 7/1989 | Furlani | ............... | A01K 39/0113 119/52.3 |
| 5,150,665 A * | 9/1992 | Boaz | .................. | A01K 39/0113 119/52.3 |
| 5,720,238 A * | 2/1998 | Drakos | .............. | A01K 39/0113 119/57.9 |
| 5,826,540 A * | 10/1998 | Bridges | .............. | A01K 39/0113 119/52.3 |
| 5,964,183 A * | 10/1999 | Czipri | .................. | A01K 39/012 119/52.3 |
| 6,158,385 A * | 12/2000 | Boyd | .................. | A01K 39/0113 119/52.3 |
| 6,253,707 B1 * | 7/2001 | Cote | .................. | A01K 39/0106 119/57.9 |
| 6,543,383 B1 * | 4/2003 | Cote | .................... | A01K 39/012 119/52.2 |
| 6,895,894 B2 * | 5/2005 | Fort, II | ................ | A01K 39/012 119/51.01 |
| 7,191,731 B2 * | 3/2007 | Cote | .................. | A01K 39/0113 119/57.9 |
| 7,735,453 B2 * | 6/2010 | Vosbikian | ............ | A01K 39/012 119/52.2 |

(Continued)

Primary Examiner — Yvonne R Abbott-Lewis
(74) Attorney, Agent, or Firm — Eric Fincham

(57) ABSTRACT

A bird feeder which comprises a seed tube having an open top end and an open lower end, a cover arranged to sit on top of the open top end, the cover being removably attached to the seed tube, a seed tube base secured at the seed tube open lower end, the seed tube base having a circular side wall and feed openings formed therein, a shroud extending about the seed tube lower end, the shroud having feed openings therein which are normally aligned with the feed openings in the circular side wall of the seed tube base, the shroud moving to a position wherein the shroud feed openings and the feed openings in the seed tube are out of alignment when a weight above a predetermined weight is present on the shroud, and a baffle formed integrally with the shroud, the baffle being located above the feed openings in the shroud.

8 Claims, 20 Drawing Sheets

(56) References Cited

U.S. PATENT DOCUMENTS

| | | | |
|---|---|---|---|
| 8,434,425 B2 * | 5/2013 | Cote | A01K 39/012 119/52.3 |
| 8,931,434 B2 * | 1/2015 | Tu | A01K 39/01 119/51.01 |
| 9,826,719 B1 * | 11/2017 | Myrberg, III | A01K 39/0113 |
| 2002/0139311 A1 * | 10/2002 | Cote | A01K 39/0113 119/57.9 |
| 2003/0033985 A1 * | 2/2003 | Hardison | A01K 39/00 119/57.9 |
| 2003/0226514 A1 * | 12/2003 | Cote | A01K 39/0113 119/57.9 |
| 2008/0105206 A1 * | 5/2008 | Rich | A01K 39/0113 119/57.9 |
| 2008/0127902 A1 * | 6/2008 | Bent N. | A01K 39/012 119/52.3 |
| 2008/0156269 A1 * | 7/2008 | Greenwood | A01K 39/0106 119/51.01 |
| 2012/0037080 A1 * | 2/2012 | Hepp | A01K 39/0113 119/52.3 |
| 2015/0305311 A1 * | 10/2015 | Murray | A01K 39/012 119/57.9 |

* cited by examiner

BIRD FEEDER

FIELD OF THE INVENTION

The present invention relates to a bird feeder, and more particularly, relates to improvements in bird feeders of the squirrel resistant type.

BACKGROUND OF THE INVENTION

The use of bird feeders as a practice of feeding birds is well known in the art in many different countries. Basically, bird feeders are used to attract birds to a location proximate a residence in order to allow for the viewing of different species of birds.

One of the problems encountered with the use of bird feeders is that they attract marauders such as squirrels who will eat the feed intended for the birds. In order to overcome this problem, many bird feeders are designed to be squirrel resistant to deny the squirrels (or other marauder) from accessing the feed within the feeders. These bird feeders are typically classified as squirrel resistant or squirrel proof feeders.

Typically, such squirrel resistant or squirrel proof feeders are provided with a movable shroud which has feed openings therein. The feed openings are normally aligned with similar feed openings in the seed tube to permit birds to access the seed therein. However, when an excess weight is placed on the shroud, it would normally move downwardly to a position wherein the feed openings are no longer aligned and the animal cannot access the feed openings in the seed tube.

Such feeders are also usually provided with a baffle to provide a cover for the feed opening and also to prevent the squirrels or other marauders from having access to the seed container. Squirrels have been known to chew at the seed containers to gain access to the seeds. One problem with such baffles is that frequently the squirrels will attempt to use the baffle as a place where they can hold on to and access the feed openings without putting weight on the shroud.

SUMMARY OF THE INVENTION

It is an object of the present invention to provide a bird feeder wherein the baffle is integrated with the shroud such that when weight is placed on the baffle, the shroud will move to protect the feed openings.

According to one aspect of the present invention, there is provided a bird feeder comprising a seed tube, the seed tube having an open top end and an open lower end, a cover arranged to sit on top of the open top end of the seed tube, the cover being removably attached to the seed tube, a seed tube base secured to the seed tube at the open lower end, the seed tube base having a circular side wall, feed openings being formed in the circular side wall, a shroud extending around the seed tube lower end, the shroud having feed openings therein, the shroud openings being normally aligned with the feed openings in the circular side wall of the seed tube base, the shroud moving to a position wherein the shroud feed openings and the feed openings in the seed tube are out of alignment when a weight above a predetermined weight is present on the shroud, and a baffle formed integrally with the shroud, the baffle being located above the feed openings in the shroud.

The seed tube, as is typical in any feeders, is preferably cylindrical in nature and is formed of a suitable transparent plastic material. Preferably the plastic material is resistant to chewing by the squirrels at exposed edges.

The cover is releasably engaged with an upper end of the seed tube. In a preferred arrangement, an upper ring is provided which will sit on the seed tube in a secure manner and will engage the cover. The cover may be rotatably mounted with respect to the upper ring. A hanger is provided and which hanger is engaged with the upper ring. In one embodiment, the hanger may engage with the body of the seed tube.

The upper ring preferably includes an arrangement wherein a slot is formed therein through which the end of the hanger passes. The slot will allow the movement of the hanger when the seed tube is removed.

The shroud of the present invention will incorporate a baffle which is formed therewith. The baffle is located above the feed openings in the shroud to provide protection thereto. In other words, the shroud will be located proximate the feed openings.

The shroud will also include a structure which will provide a perching area for the birds.

The seed tube base will also include a deflector located above the feed openings. The deflector is designed to deflect water flowing down from the seed tube to a location intermediate the feed openings.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
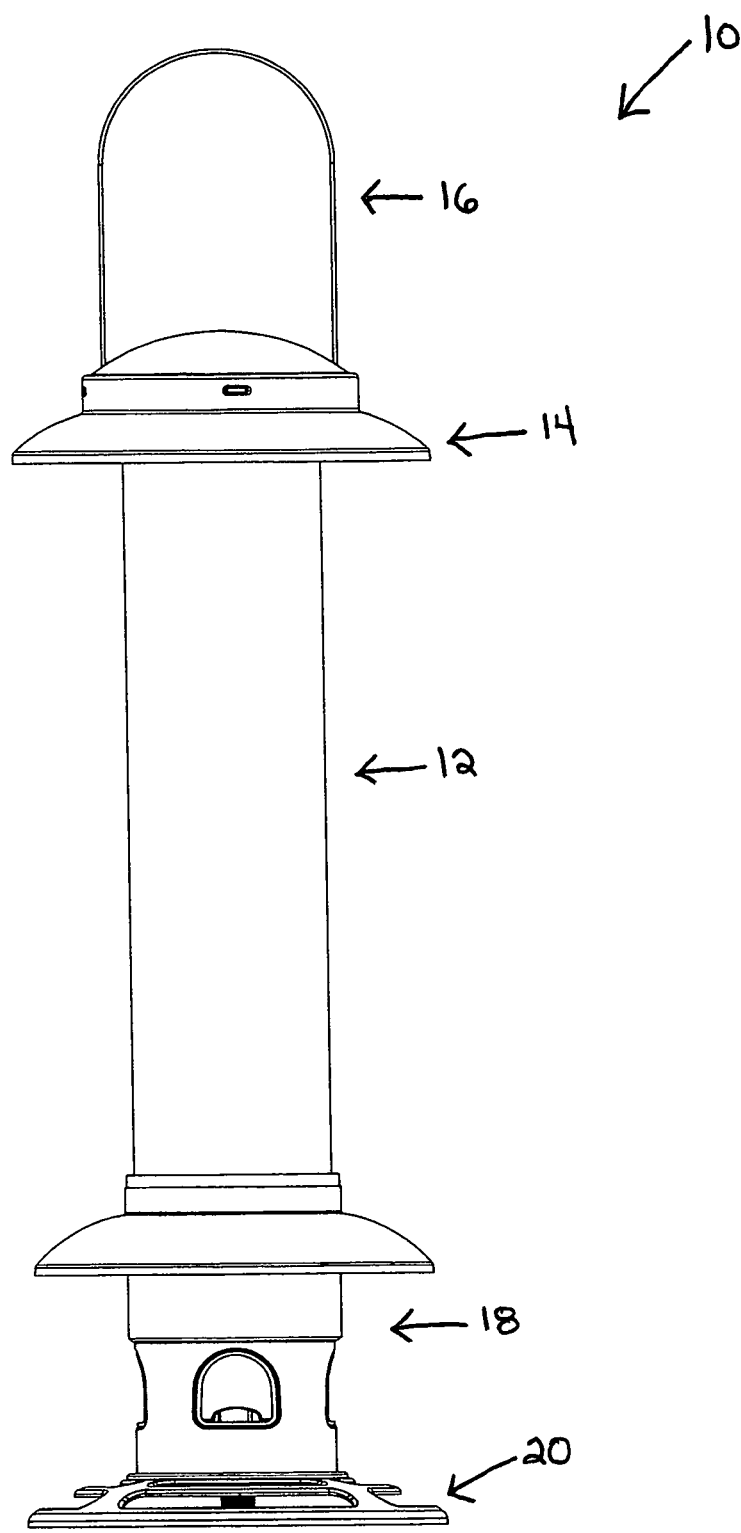
FIG. 1 is a side elevational view of a bird feeder according to one embodiment of the present invention.
Figure 2:
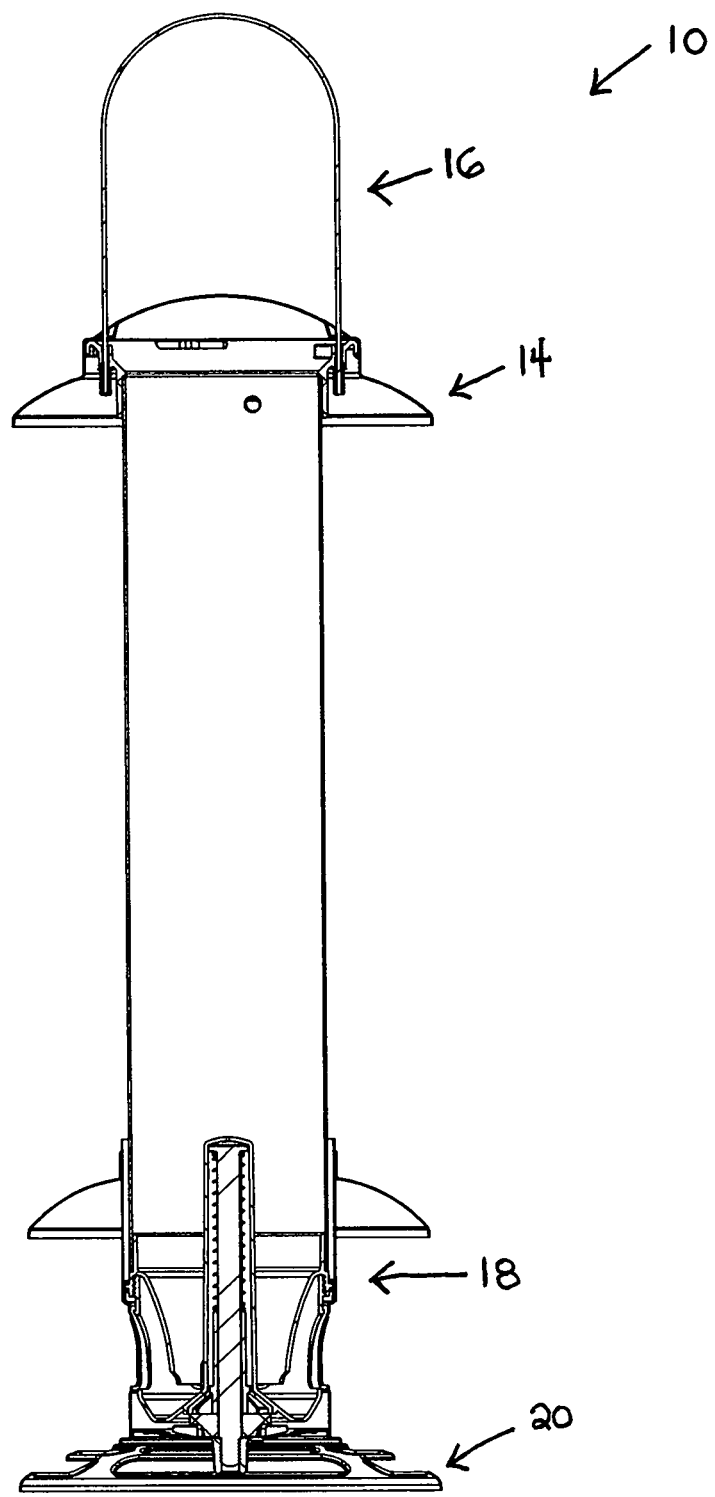
FIG. 2 is a longitudinal sectional view thereof.
Figure 3:
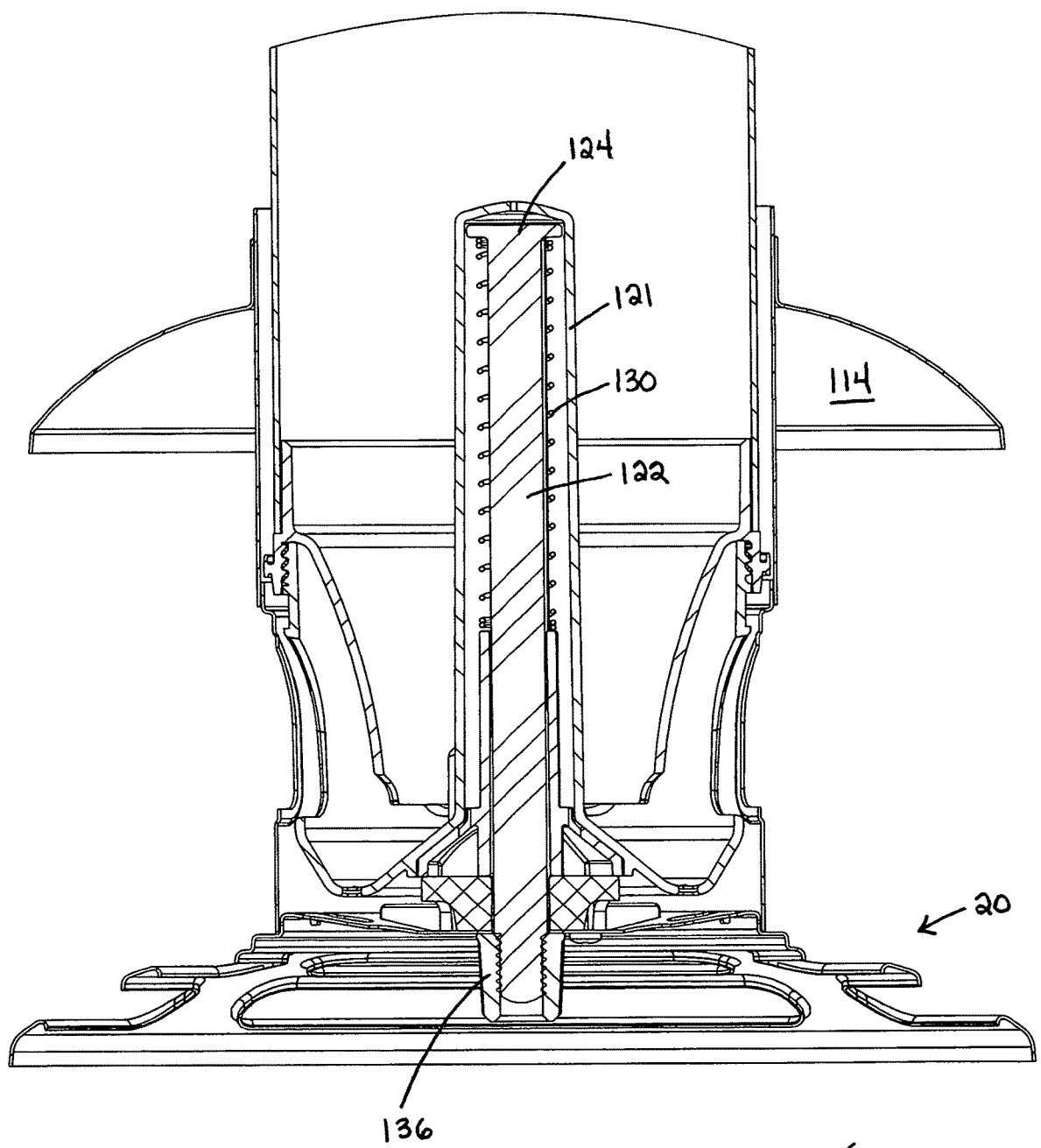
FIG. 3 is a longitudinal sectional view of the bottom portion of the bird feeder of FIG. 1.

Referring to the drawings in greater detail and by reference characters thereto, there is illustrated a bird feeder of the squirrel resistant type and which bird feeder is generally designated by reference numeral 10.

Bird feeder 10 is comprised of a seed tube generally designated by reference numeral 12, a cover generally designated by reference numeral 14, a hanger generally designated by reference numeral 16, a shroud generally designated by reference numeral 18, and a stand (forming a portion of shroud 18) generally designated by reference numeral 20. Bird feeder 10 also includes a funnel generally designated by reference numeral 22 and a seed tube base generally designated by reference numeral 24.

Seed tube 12 defines a seed container having a cylindrical wall 28. Seed tube 12 has an open upper end 30 and an open lower end 32.

Located at open upper end 30 is a an upper ring 34 which sits on seed tube 12. Upper ring 34 includes a lower circular wall 36 and an upwardly tapering wall 38. Upper ring 34 also includes an upper side wall 40 which has protrusions 42 extending outwardly therefrom. Preferably, there are provided a pair of such protrusions 42 each being diametrically opposed to the other. A pair of recesses 44 are provided in upper side wall 40 for reasons which will become apparent hereinbelow. Also, an upwardly extending wall 46 defines a slot 48. There are two such structures located on upper ring 34.

Figure 8:
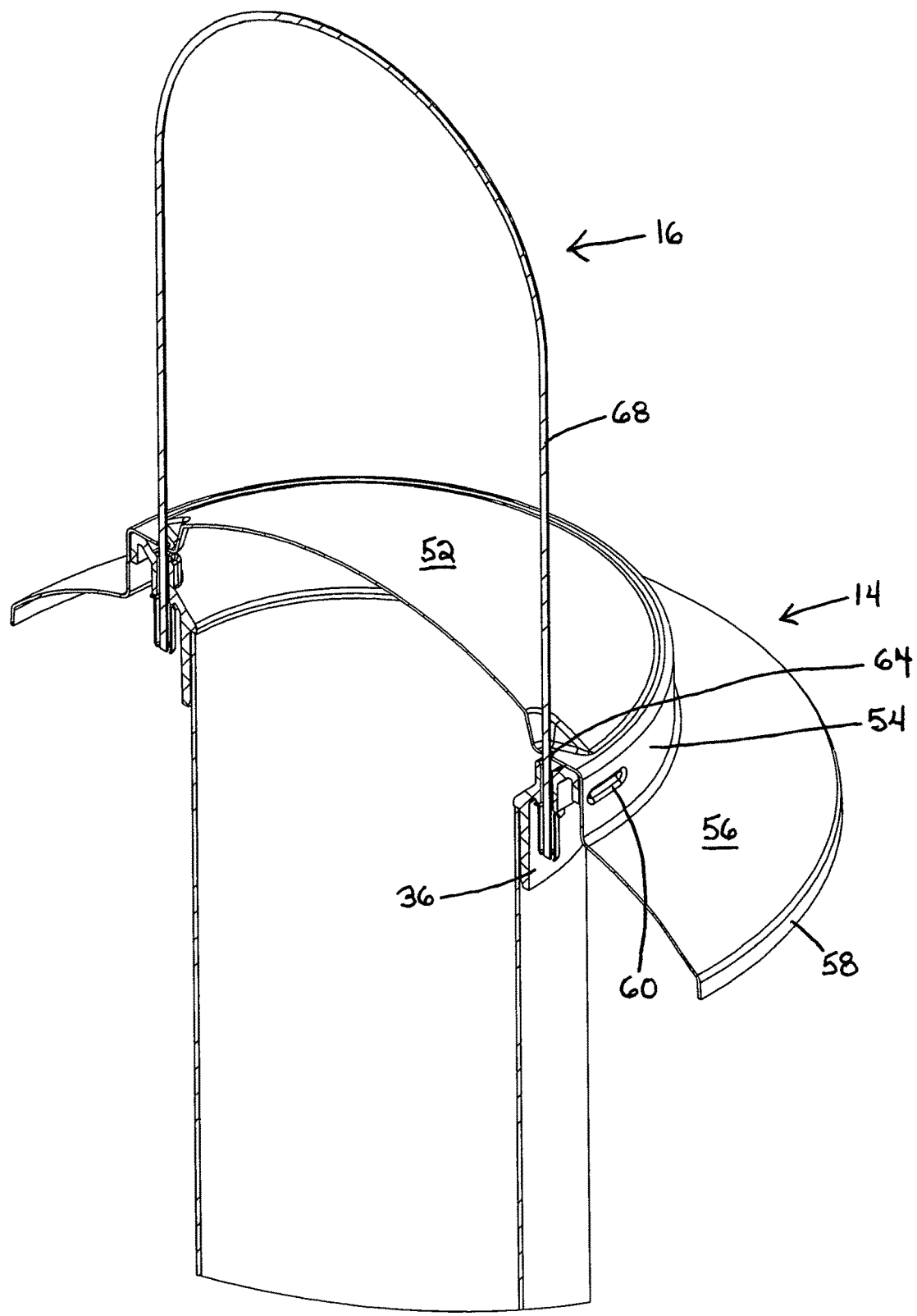
FIG. 8 is an enlarged perspective sectional view of the upper portion of a bird feeder according to an embodiment of the present invention.
Figure 9:
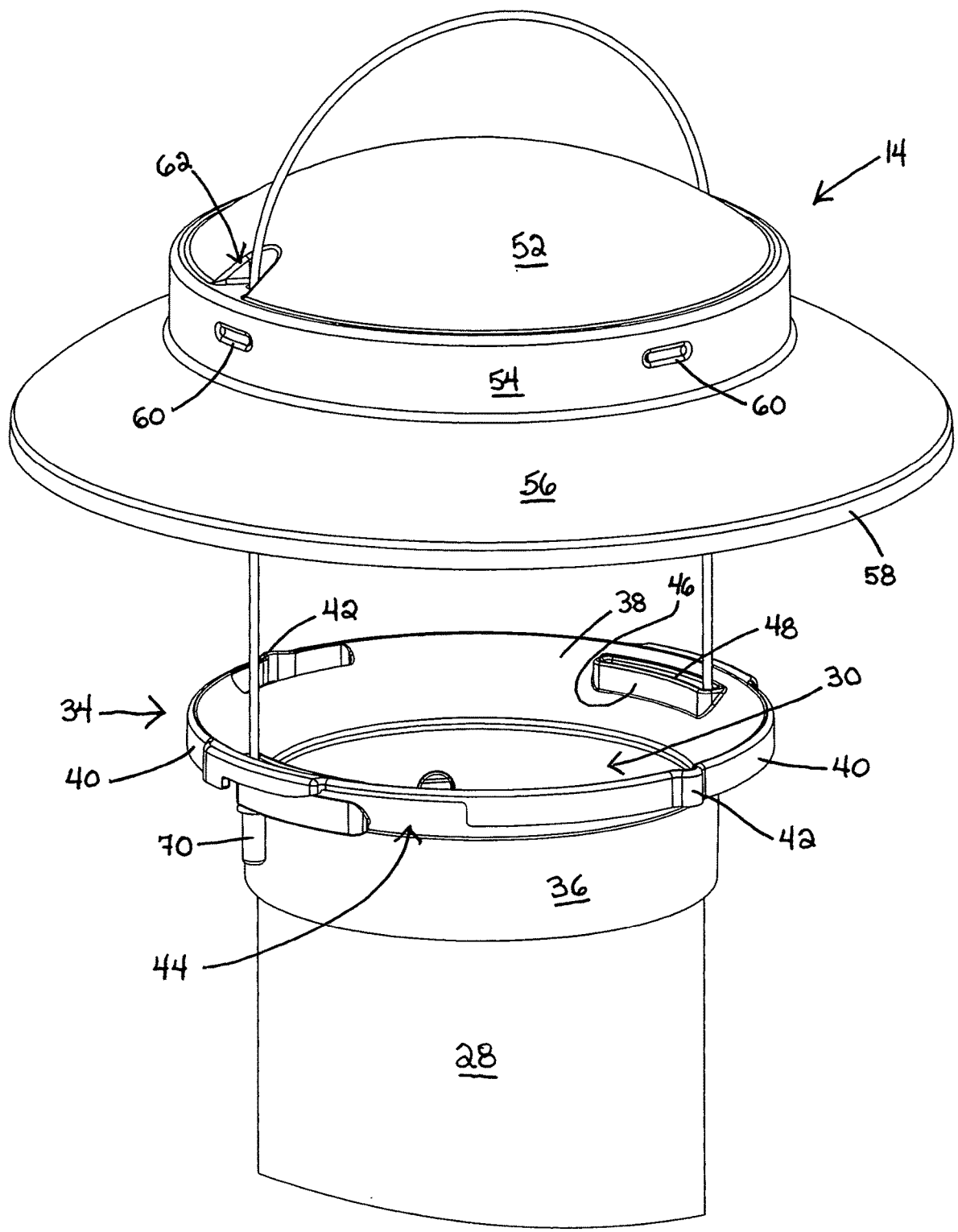
FIG. 9 is an enlarged perspective view of the upper portion of a bird feeder when the cover is not secured to the bird feeder.
Figure 10:
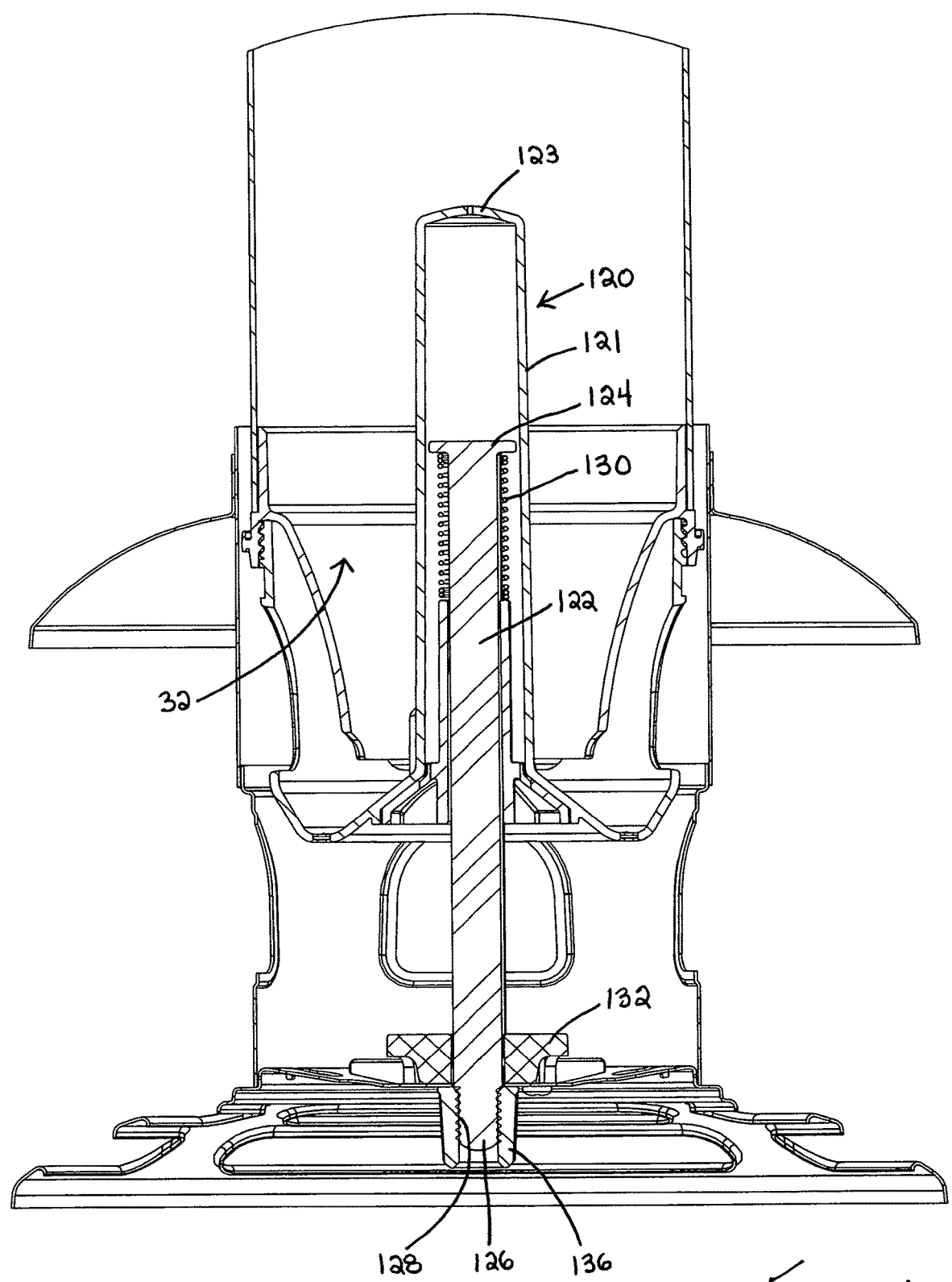
FIG. 10 is a further sectional view of the bird feeder when the shroud is misaligned with the seed tube.
Figure 11:
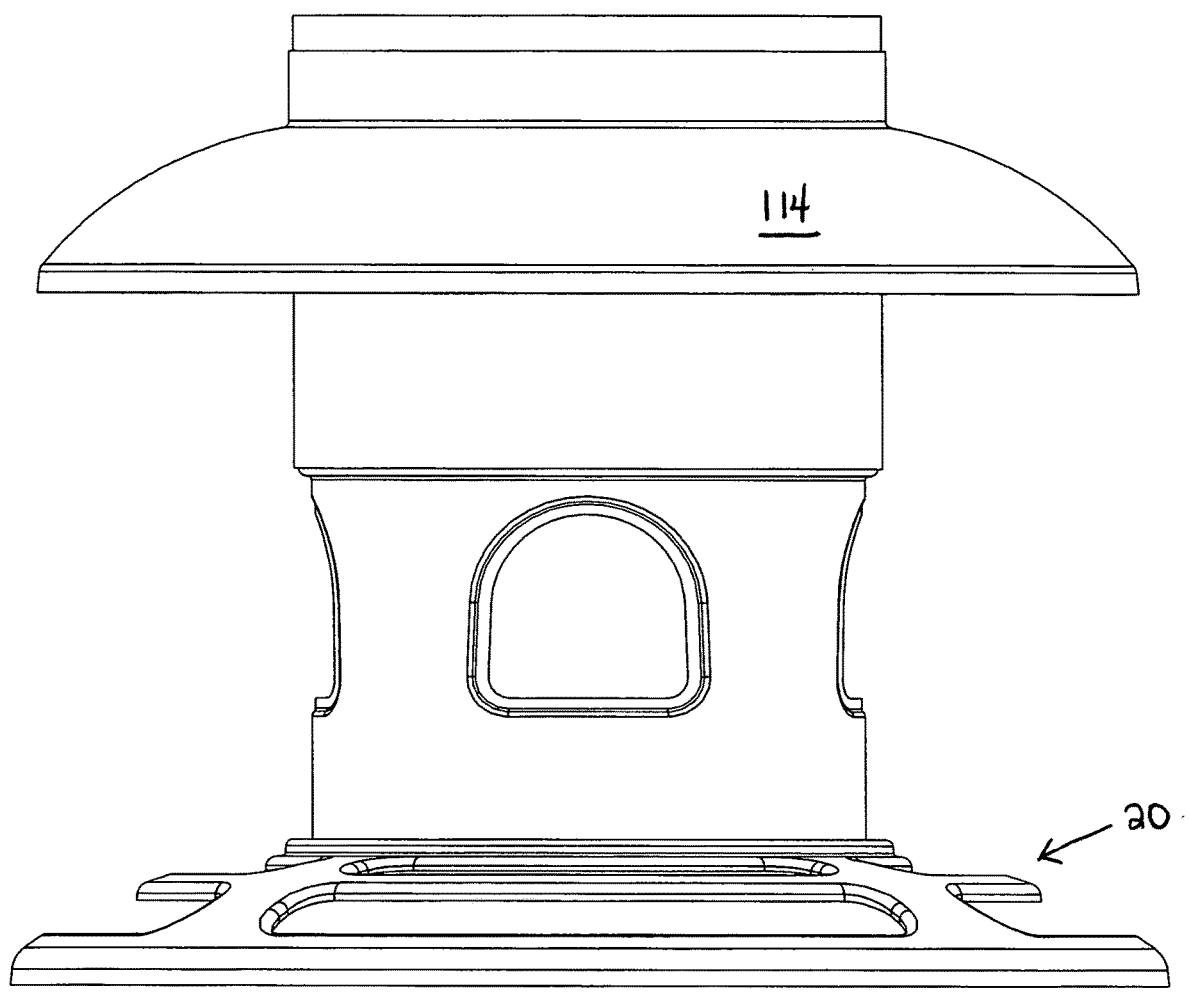
FIG. 11 is a side elevational view of the lower portion of the bird feeder.
Figure 12:
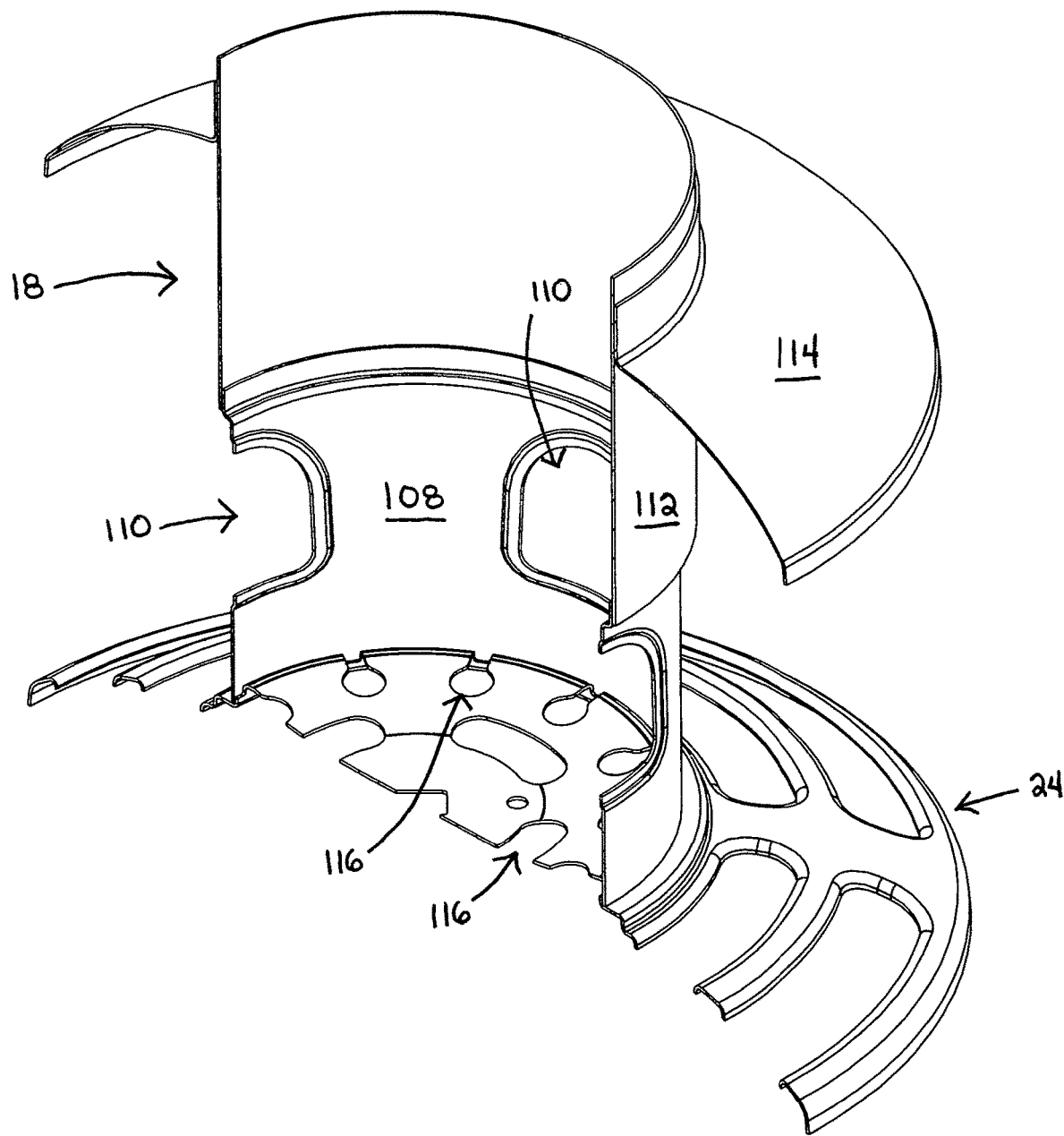
FIG. 12 is a side cutaway view of the lower portion of the bird feeder.

Cover 14, as may be seen in FIGS. 8 and 9, has a domed top wall 52 and a vertical side wall 54 extending downwardly therefrom. There is also provided a sloping wall 56 which terminates in a drip edge 58. Protrusions 60 are provided on the inner surface of vertical side wall 54. Preferably four such protrusions are provided. A pair of diametrically opposed protrusions 60 are designed to engage with protrusions 42 to hold the cover in position. A second pair of protrusions 60 engage within recesses 44 as is known in the art. Cover 14 also has a pair of recesses 62 formed in domed top wall 52 with an aperture 64 being located thereat.

Figure 15:
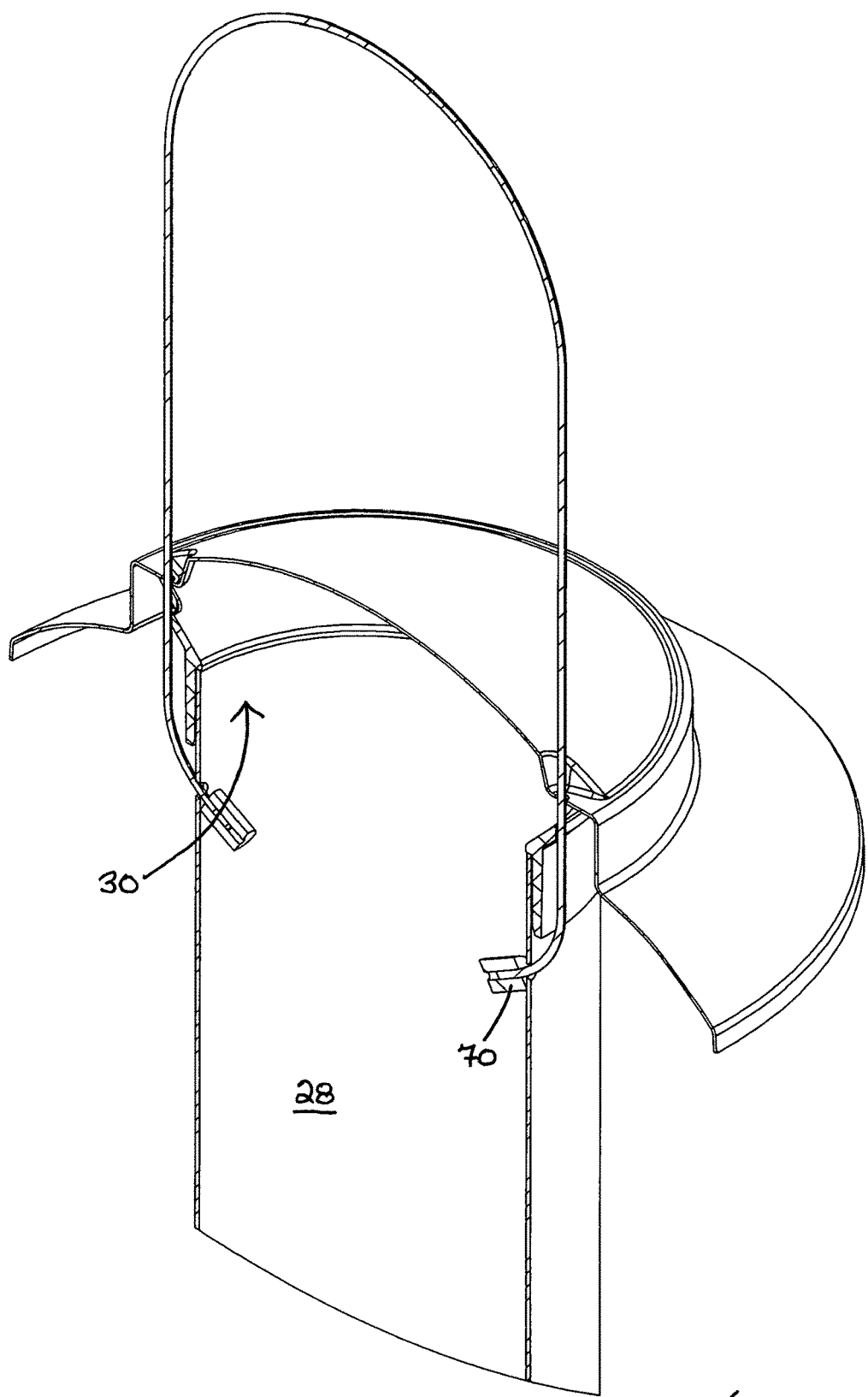
FIG. 15 is a perspective cutaway view of the upper portion of a further embodiment of the bird feeder.
Figure 16:
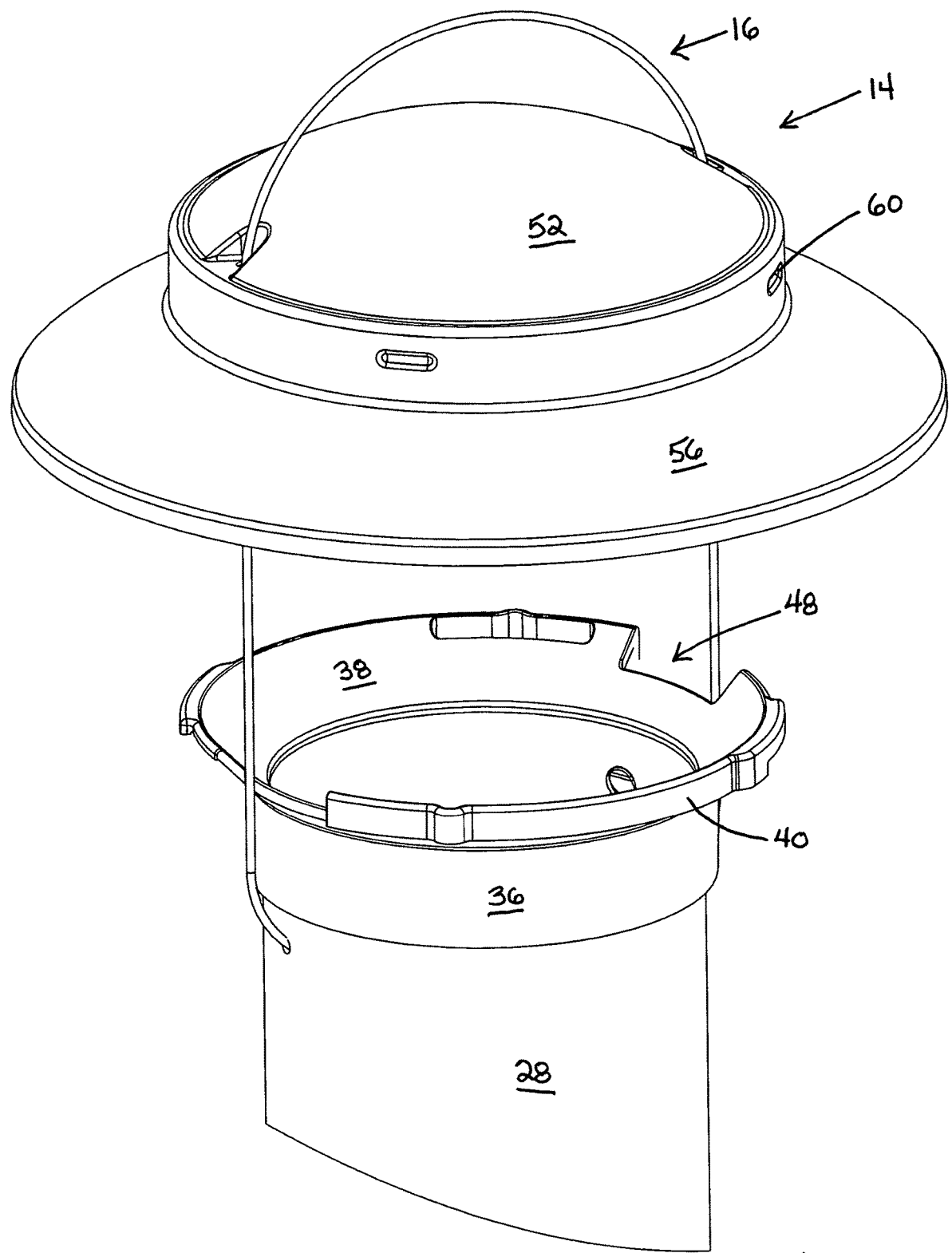
FIG. 16 is a partially exploded view of the upper portion of the bird feeder as shown in FIG. 15.

Hanger 16 comprises a relatively stiff wire 68. Wire 68 passes through aperture 64 and is provided with an enlarged portion 70 which sits under upper ring 34 and is thereby retained in position. In an alternative embodiment illustrated in FIGS. 15 and 16, wire 68 passes through cylindrical wall 28 with enlarged portion 70 retaining the wire.

Figure 17:
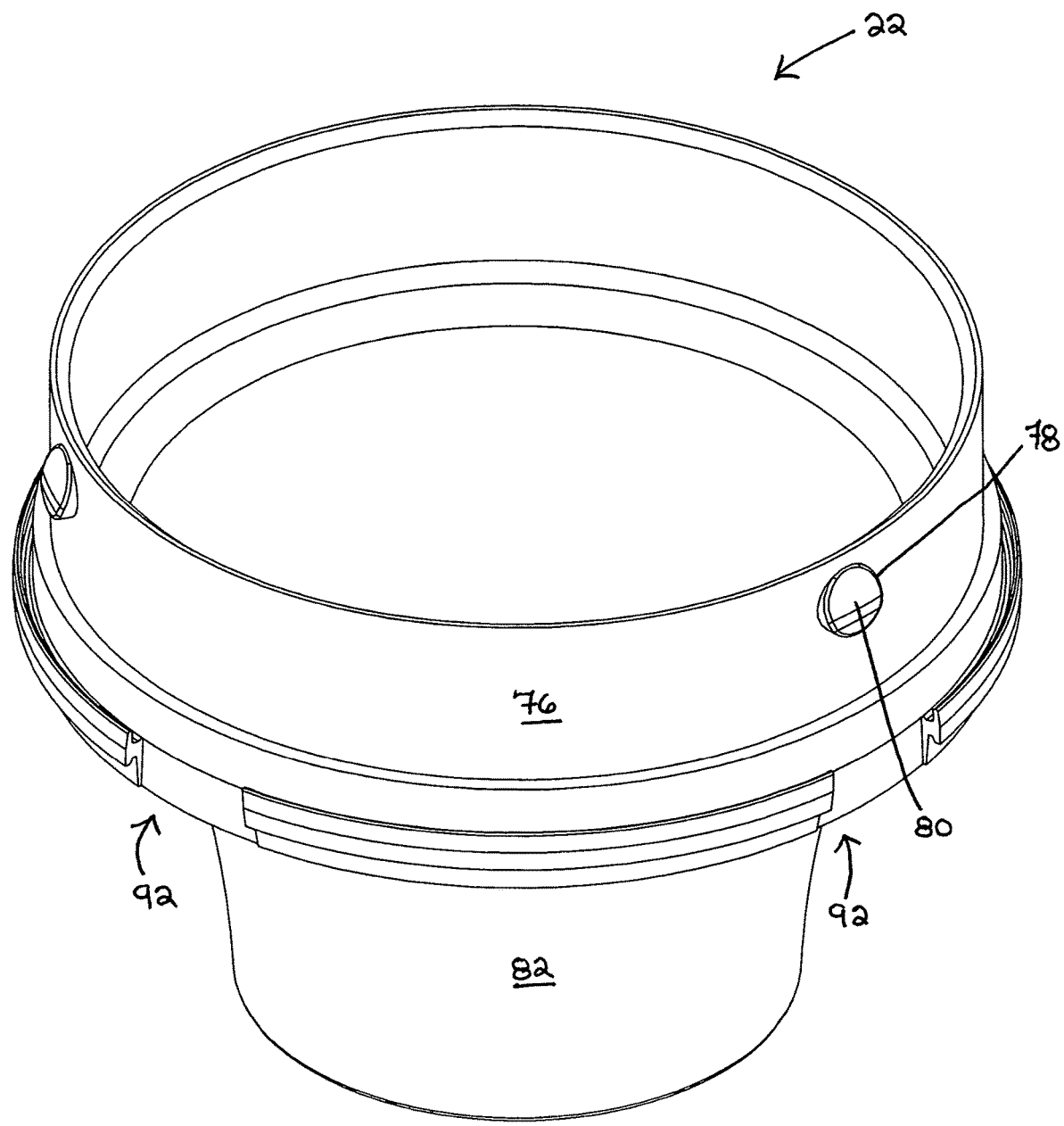
FIG. 17 is a perspective view of the funnel member of the bird feeder.
Figure 18:
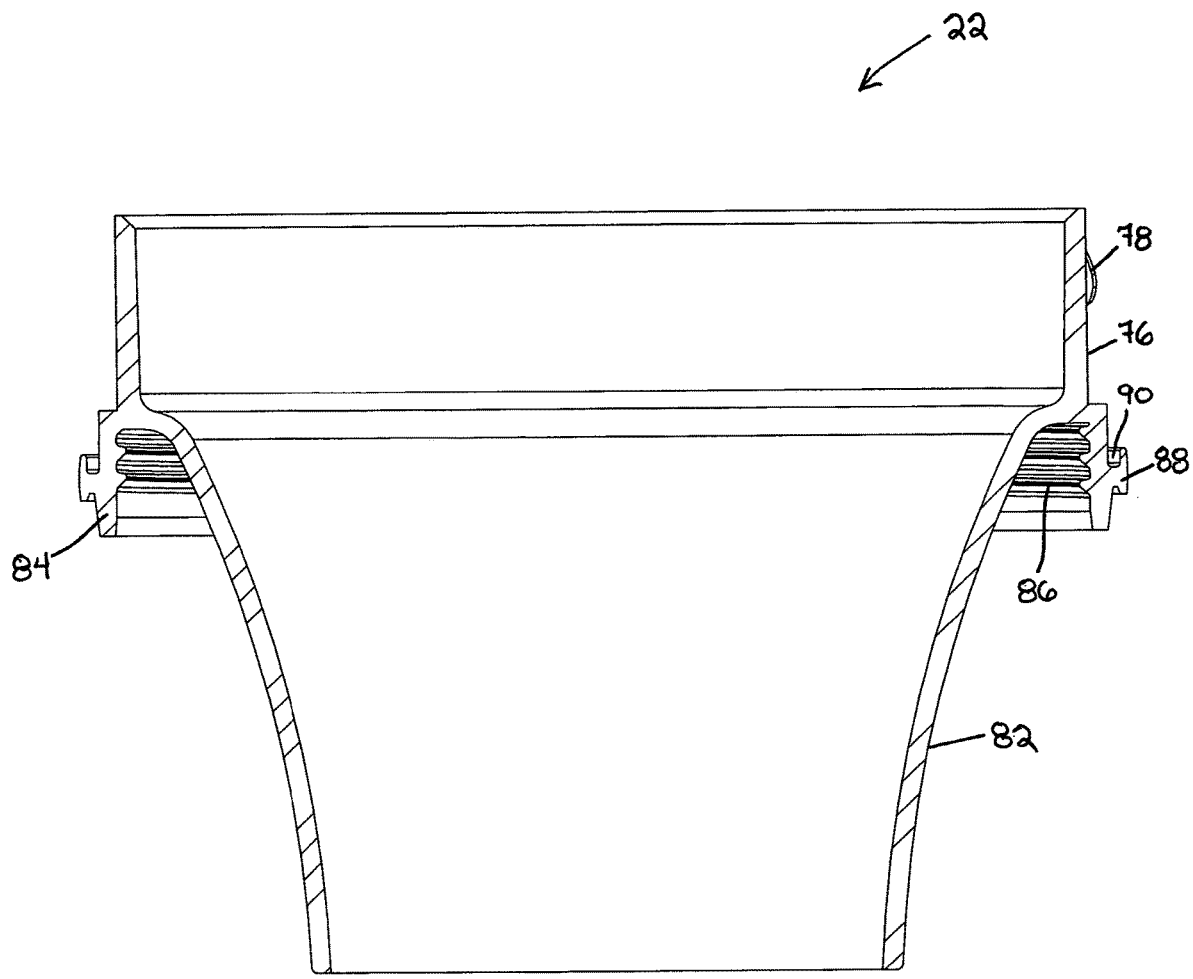
FIG. 18 is a sectional view thereof.
Figure 19:
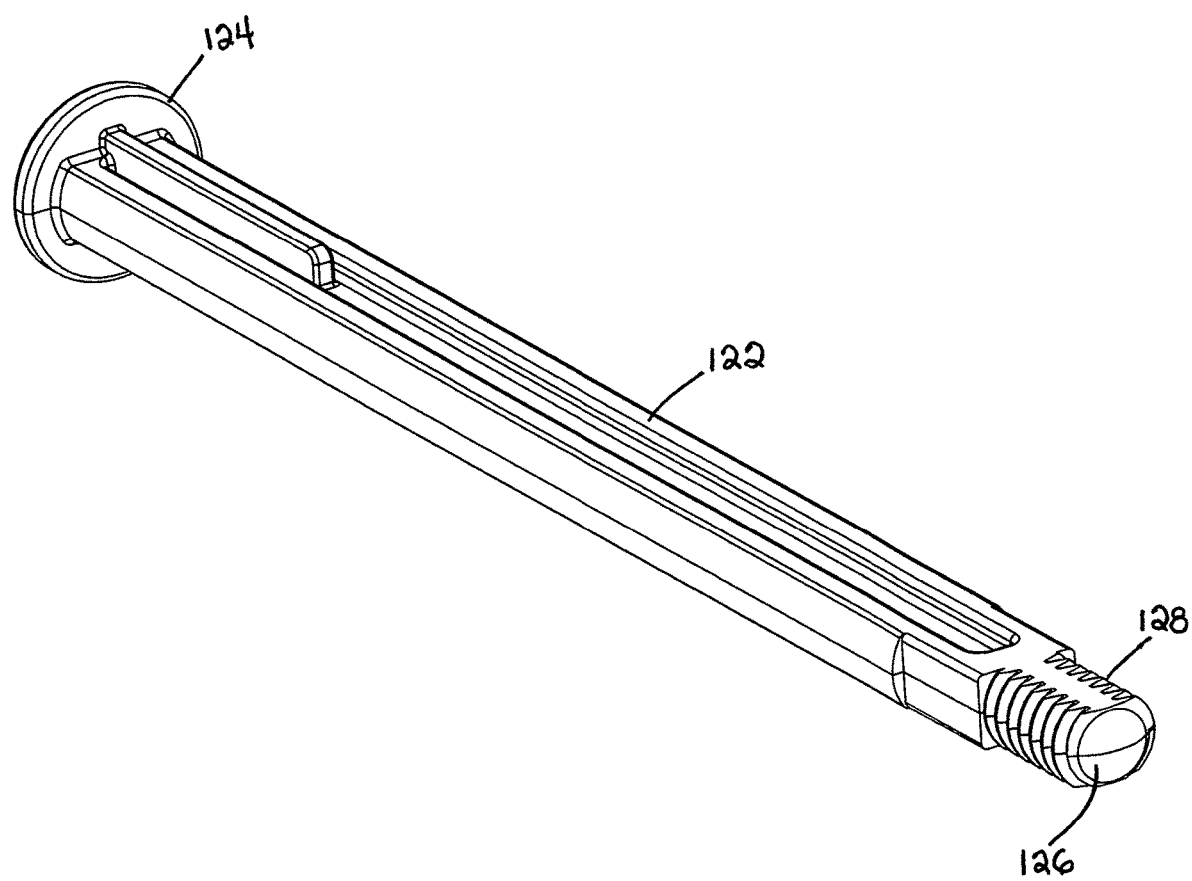
FIG. 19 is a perspective view of an inner rod member of the bird feeder.
Figure 20:
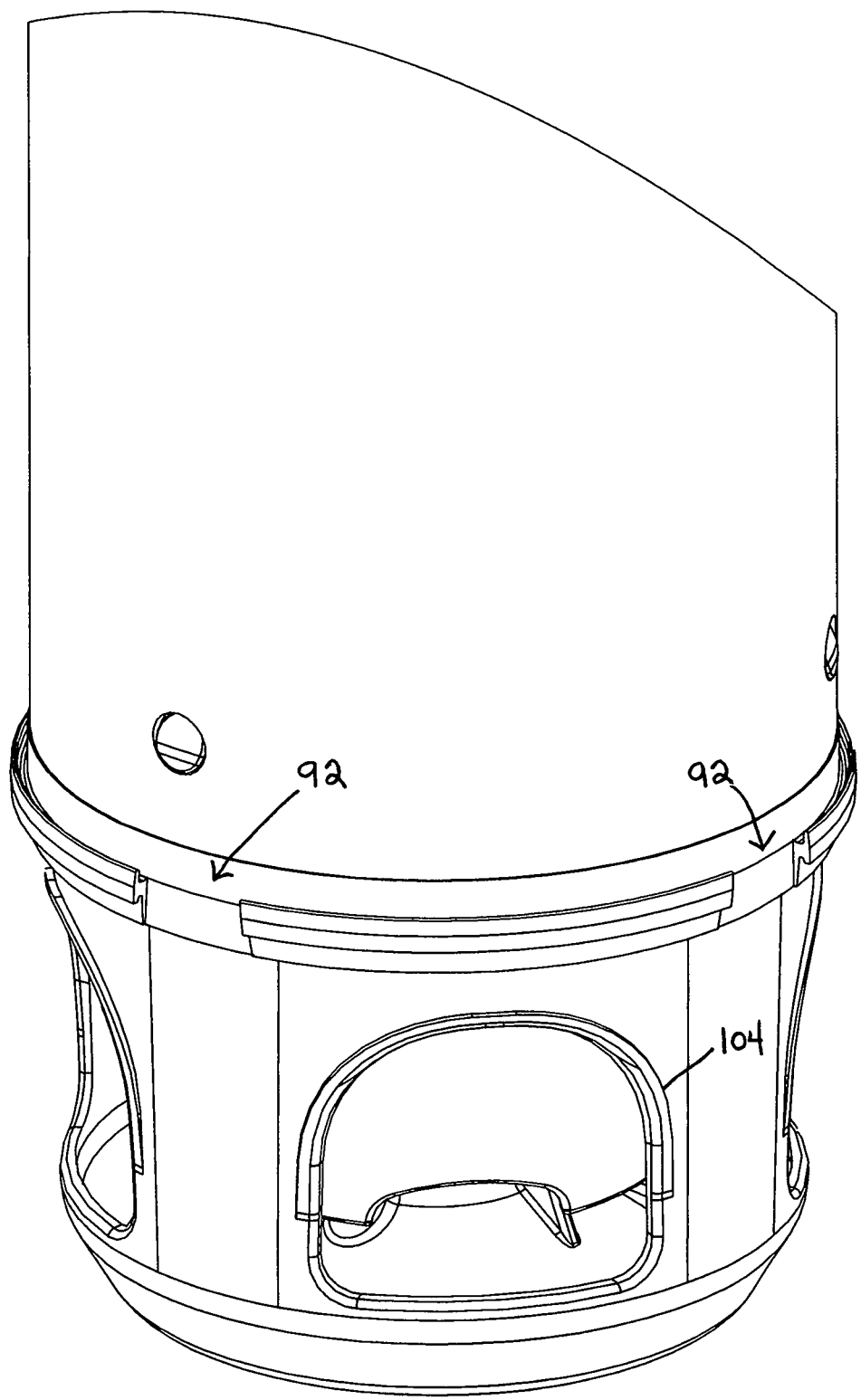
FIG. 20 is a perspective view of the base member and securement thereof to the funnel member and seed tube.

Funnel 22, best illustrated in FIGS. 17 and 18, has an upper wall 76 with a plurality of protrusions 78 being formed thereon. Each protrusion 78 is designed to fit within an aperture formed in the bottom portion of cylindrical wall 28 of seed tube 12. To aid in locking and unlocking, a sloping wall 80 is provided thereon.

Funnel 22 also has a lower wall 82 which is funnel shaped to help direct seeds as will be discussed hereinbelow. A middle wall section 84 extends downwardly from upper wall 76 and is spaced from lower wall 82. Threads 86 are provided on the interior of middle wall 84. A drainage member 88 extends outwardly from middle wall section 84 and has a U-shaped drainage channel 90 formed therein for reasons which will become apparent hereinbelow. It will be noted that there are gaps 92 between sections of middle wall section 84 to direct any water away from the feed openings.

Figure 13:
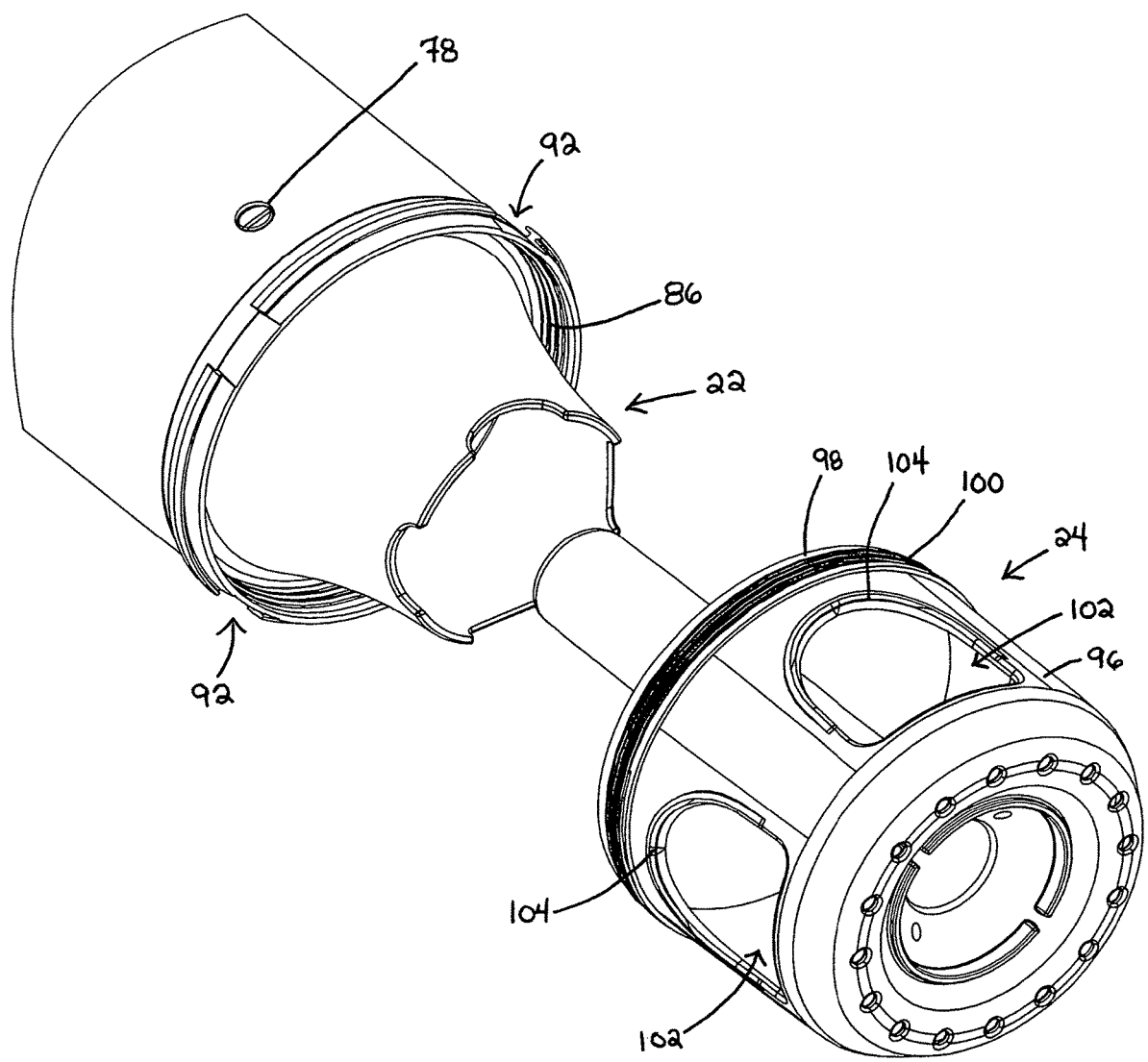
FIG. 13 is an exploded view showing the funnel and base portion of the bird feeder.
Figure 14:
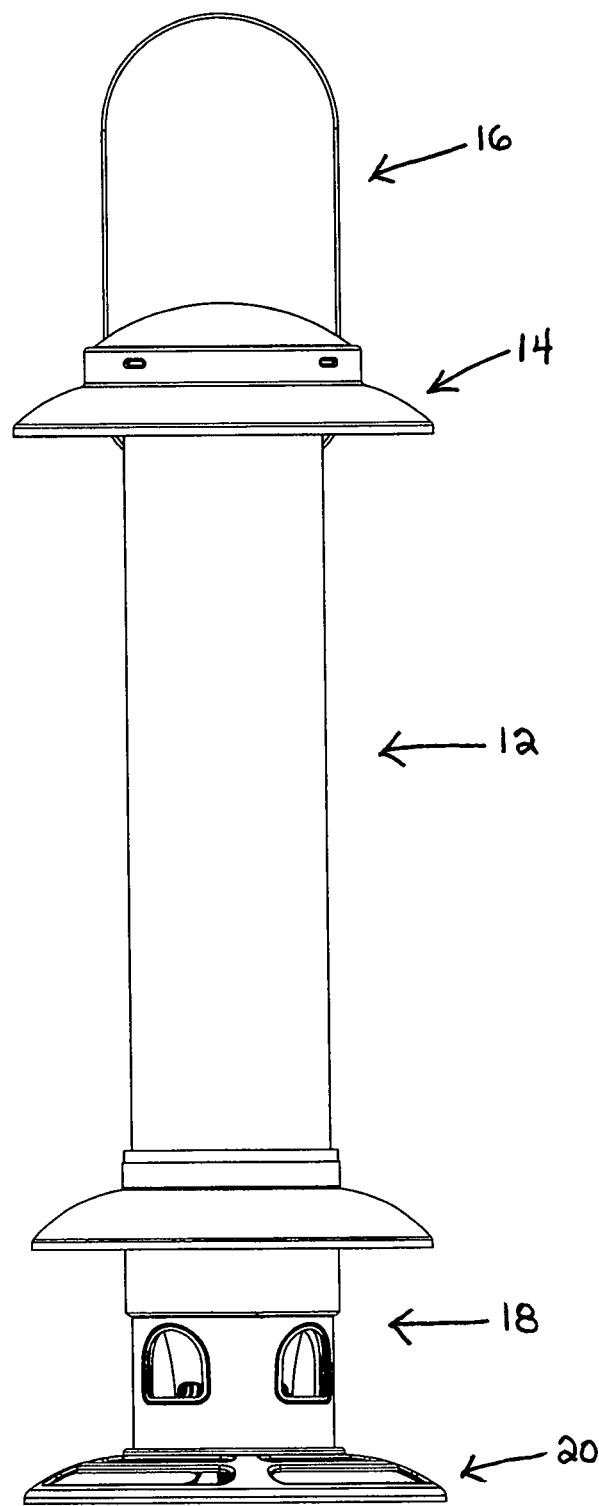
FIG. 14 is a side elevational view of the bird feeder.

Seed tube base 24, as may be seen in FIG. 13, has an upper side wall 98 which has a plurality of threads 100 thereon. Threads 100 are designed to engage with threads 86 formed on middle wall section 84 of funnel 22. A plurality of feed openings 102 are provided in side wall 96 of seed tube base 24. As will be noted, there is provided a rim protrusion 104 which extends partially about the upper portion of feed openings 102. This arrangement allows rainwater to pass to the side of the feed openings 102.

Shroud 18 has a lower side wall 108 with a plurality of feed openings 110 therein. An upper side wall 112 is directed to lower side wall 108. A baffle 114 extends circumferentially around the shroud and is located on upper side wall 112 such that it is above feed openings 110 to provide protection from the weather such as rain. It is obviously important that the baffle is located above the feed openings while also being close to the feed openings. An interior bottom wall has a plurality of drainage apertures 116 formed therein.

Located inwardly of the seed tube base is a longitudinally extending post generally designated by reference numeral 120. Post 120 is formed of a cylindrical wall 121 having a top wall 123. Located internally of post 120 is a rod 122 which has a flange 124 formed at the top end thereof. A lower portion 126 of rod 122 has screwthreads 128 formed thereon. Extending about rod 122 is a coil spring 130 which has a first end biased against top flange 124. A base member 132 is provided and is connected to the seed tube base by means of screws 134. A cap 136 is screwthreadedly engaged with lower portion 126 by screwthreaded engagement with screwthreads 128.

Figure 4:
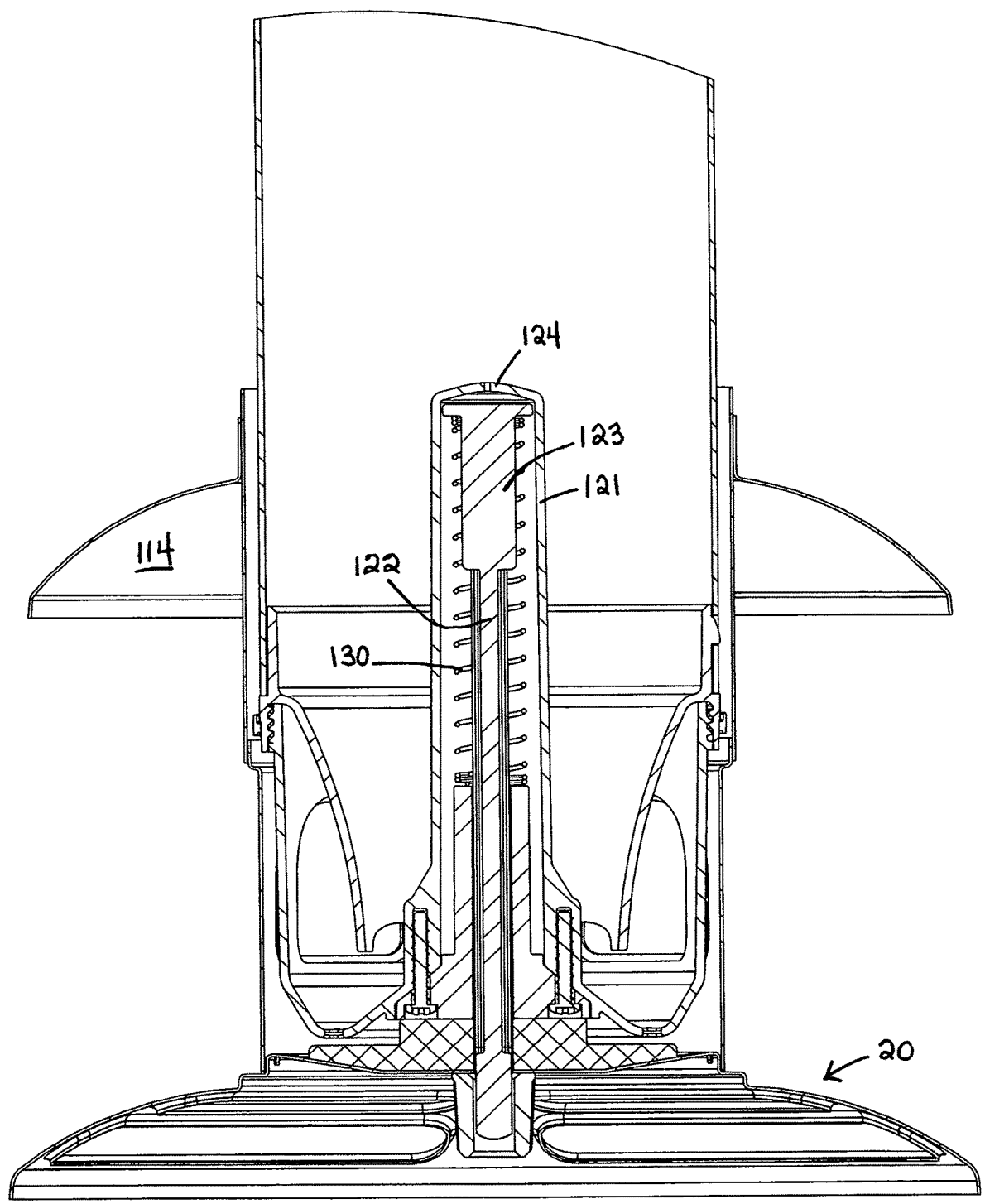
FIG. 4 is a longitudinal sectional view of the bottom portion of a further embodiment of a bird feeder according to the present invention.
Figure 5:
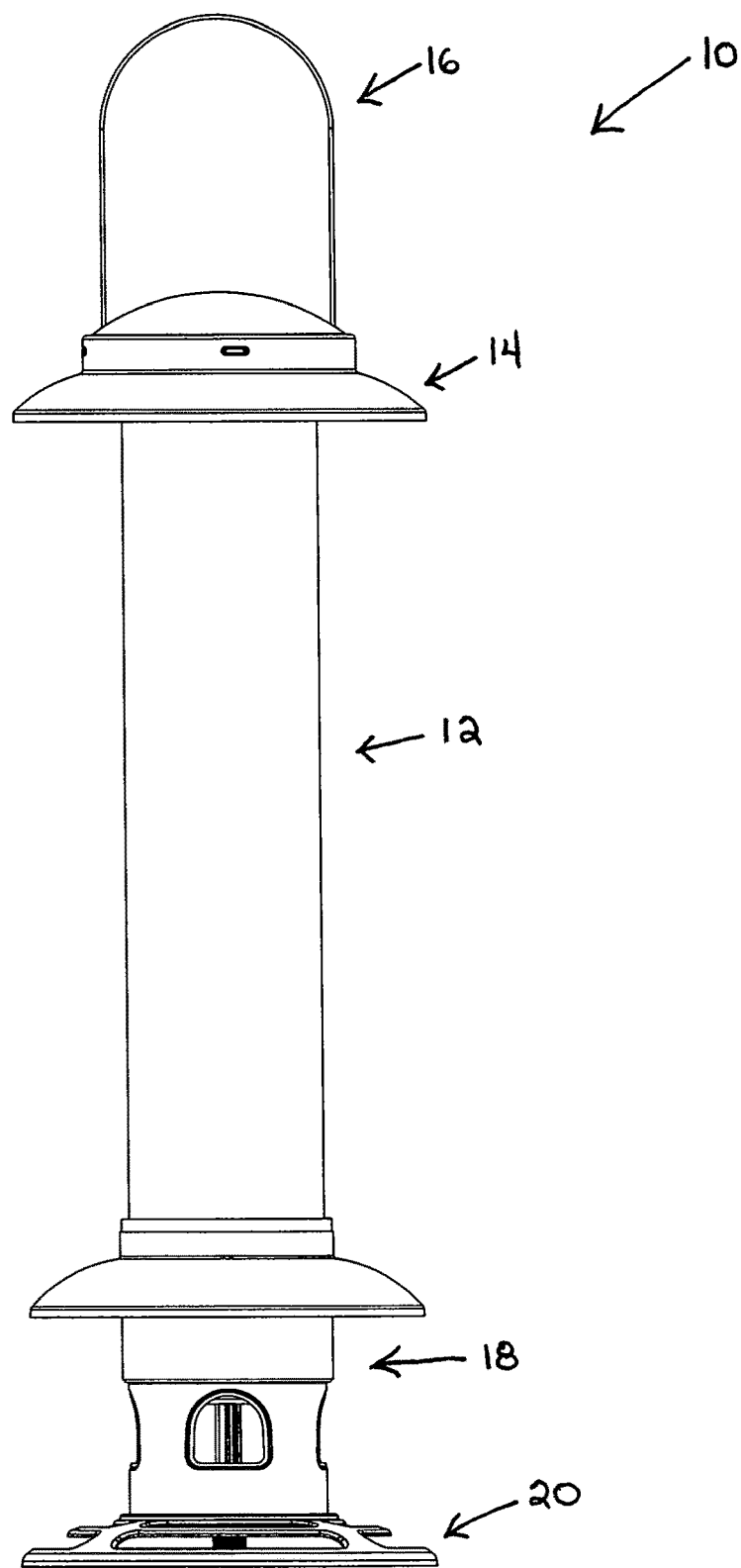
FIG. 5 is a side elevational view of the bird feeder of FIG. 4.
Figure 6:
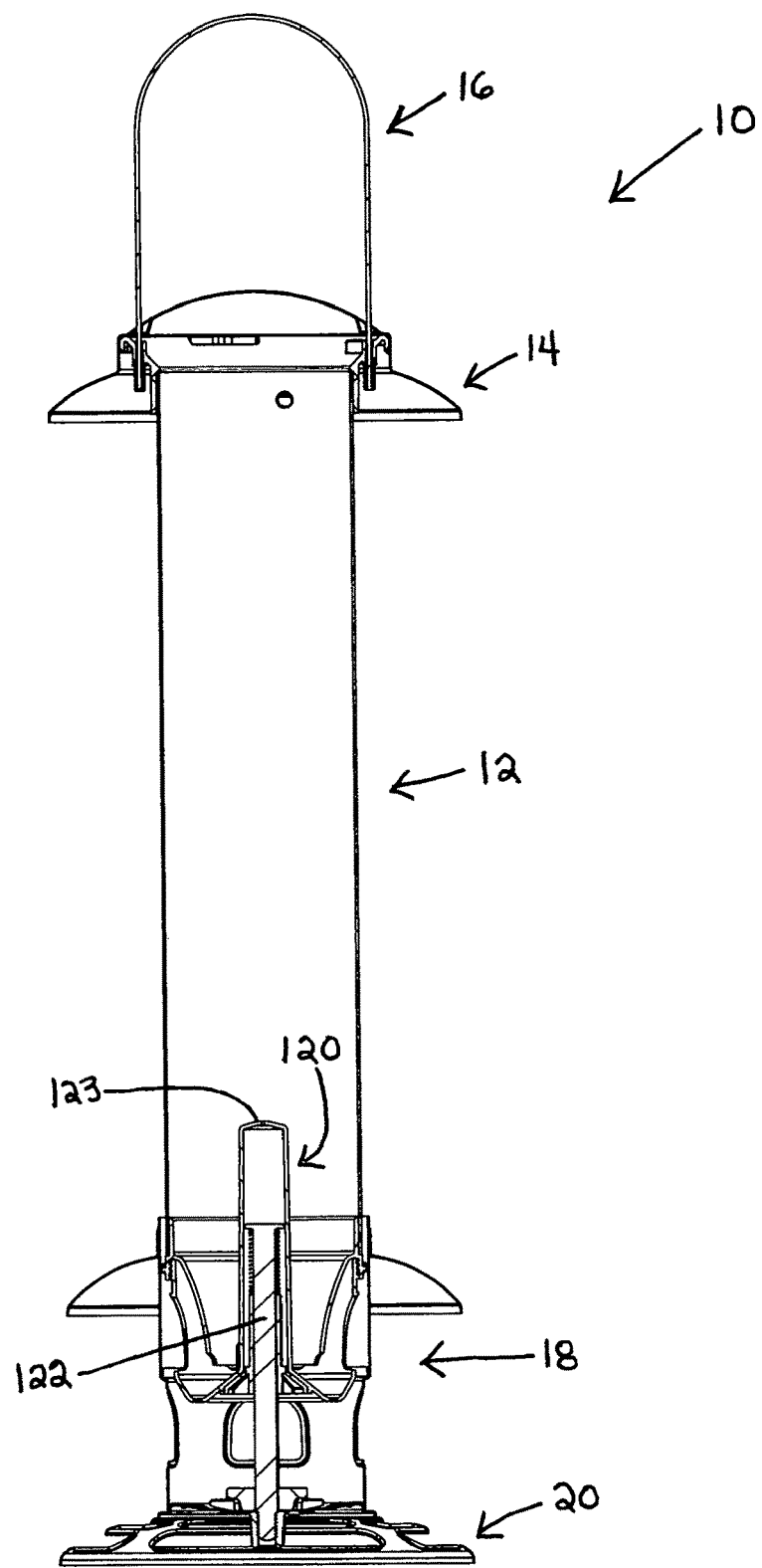
FIG. 6 is a longitudinal sectional view of the bird feeder of FIG. 5.
Figure 7:
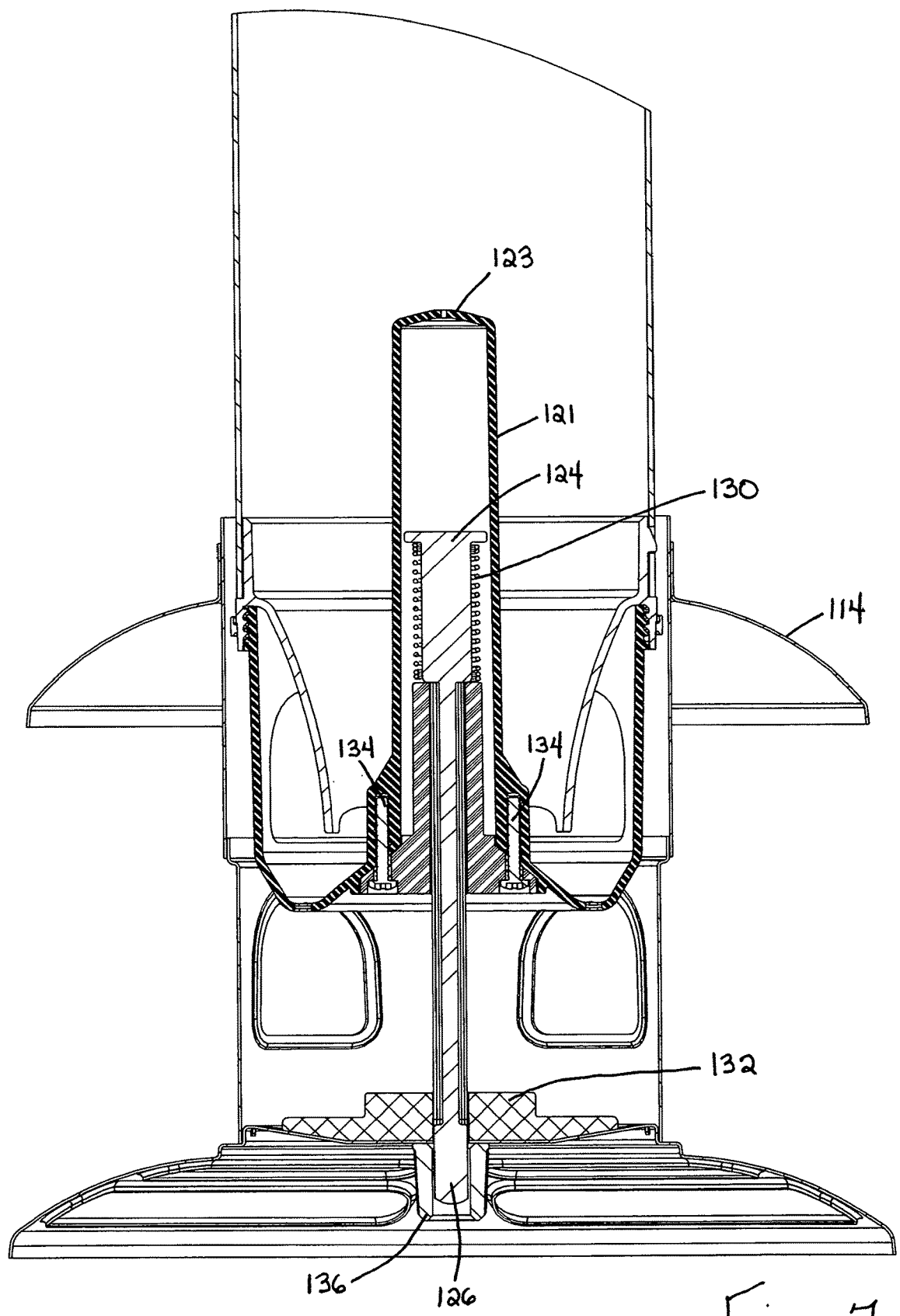
FIG. 7 is a longitudinal sectional view of the bottom portion of a bird feeder when the shroud is lowered, denying access to the seed within the bird feeder.

In the embodiment of FIG. 4, rod 122 has an enlarged portion 123 at its upper end.

It will be understood that the above described embodiment is for purposes of illustration and that changes and modifications may be made thereto without departing from the spirit and scope of the invention.

I claim:

1. A bird feeder comprising:
   a seed tube, said seed tube having an open top end and an open lower end;
   a cover arranged to sit on top of said open top end of said seed tube, said cover being removably attached to said seed tube;
   a seed tube base secured to said seed tube at said open lower end, said seed tube base having a circular side wall, feed openings being formed in said circular side wall;
   a shroud extending around said seed tube lower end, said shroud having feed openings therein, said shroud openings being normally aligned with said feed openings in said circular side wall of said seed tube base, said shroud moving to a position wherein said shroud feed openings and said feed openings in said seed tube are out of alignment when a weight above a predetermined weight is present on said shroud; and
   a baffle formed integrally with said shroud, said baffle being located above said feed openings in said shroud.

2. The bird feeder of claim 1 further including a funnel member secured to said seed tube lower end, said seed tube lower end being screwthreadedly engaged with said funnel member.

3. The bird feeder of claim 1 wherein said seed tube base includes drainage apertures in said bottom wall.

4. The bird feeder of claim 1 wherein said shroud includes a baffle extending about and secured to said shroud, said baffle being located above said shroud feed openings.

5. The bird feeder of claim 1 wherein said seed tube base includes a deflector located above said feed openings in said circular side wall, said deflector being designed to deflect water flowing down said seed tube to a location intermediate said feed openings.

6. The bird feeder of claim 1 wherein said shroud includes a plurality of perch members located below said shroud feed openings.

7. The bird feeder of claim 1 further including a hanger, said hanger being connected to said cover.

8. The bird feeder of claim 1 wherein said bird feeder includes a top ring, said top ring being secured to said open top end of said seed tube, said cover being removably secured to said top ring.

* * * * *